United States Patent
Goncalves et al.

(10) Patent No.: US 12,479,408 B2
(45) Date of Patent: Nov. 25, 2025

(54) CONTROL MECHANISM FOR A RAIL SYSTEM, RAIL SYSTEM PROVIDED WITH SUCH A MECHANISM AND RAIL VEHICLE PROVIDED WITH SUCH A SYSTEM

(71) Applicant: WABTEC Hauts-de-France, Amiens (FR)

(72) Inventors: Claudino Goncalves, Ribeaucourt (FR); Denis Gerber-Papin, l'Etoile (FR); Emmanuel Orlando, Sin le Noble (FR)

(73) Assignee: WABTEC Hauts-de-France, Amiens (FR)

( * ) Notice: Subject to any disclaimer, the term of this patent is extended or adjusted under 35 U.S.C. 154(b) by 0 days.

(21) Appl. No.: 18/716,068

(22) PCT Filed: Nov. 29, 2022

(86) PCT No.: PCT/FR2022/052194
§ 371 (c)(1),
(2) Date: Jun. 3, 2024

(87) PCT Pub. No.: WO2023/099839
PCT Pub. Date: Jun. 8, 2023

(65) Prior Publication Data
US 2025/0033617 A1    Jan. 30, 2025

(30) Foreign Application Priority Data
Dec. 2, 2021 (FR) ..................................... 2112850

(51) Int. Cl.
*B60T 11/04* (2006.01)
*B61H 13/02* (2006.01)

(52) U.S. Cl.
CPC ............ *B60T 11/046* (2013.01); *B61H 13/02* (2013.01)

(58) Field of Classification Search
CPC ...... B60T 11/046; B60T 17/16; B60T 17/228; B60T 17/088; B60T 17/083; B60T 17/086; B61H 5/00
See application file for complete search history.

(56) References Cited

U.S. PATENT DOCUMENTS

| | | | | |
|---|---|---|---|---|
| 3,402,792 A | * | 9/1968 | Masser | B60T 13/261 188/170 |
| 4,480,531 A | * | 11/1984 | Mylius | B60T 17/086 92/29 |
| 11,866,017 B2 | * | 1/2024 | Persson | B60T 17/083 |

FOREIGN PATENT DOCUMENTS

| | | | |
|---|---|---|---|
| DE | 3723683 A1 * | 1/1989 | ............. B60T 13/22 |
| EP | 2154040 A1 | 2/2010 | |

(Continued)

OTHER PUBLICATIONS

International Search Report and Written Opinion for corresponding PCT Application No. PCT/FR2022/052194, mailed Mar. 29, 2023.

*Primary Examiner* — Thomas C Diaz
(74) *Attorney, Agent, or Firm* — K&L Gates LLP

(57) ABSTRACT

The invention relates to a control mechanism (105) configured to equip a rail system and including a casing (106) from which a control rod (109) projects, configured to be mechanically and securely connected to a control cable (107) actuatable at a distance from or in proximity to the casing, a plate (115) mechanically connected to the casing and from which the control rod projects, and a locking/unlocking device (135) positioned in a recess (124) provided in the plate and having a stable position, the control mechanism being configured so that, when the control cable is mechanically connected to the control rod, the locking/unlocking device is elastically moved away from its stable position to allow the partial introduction of the control cable (Continued)

in the plate as far as a position in which the control cable is mechanically and securely connected to the control rod.

17 Claims, 9 Drawing Sheets

(56) References Cited

FOREIGN PATENT DOCUMENTS

| | | | |
|---|---|---|---|
| EP | 3385136 | A1 | 10/2018 |
| EP | 3789258 | A1 | 3/2021 |
| WO | 2014042031 | A1 | 3/2014 |
| WO | 2023099839 | A1 | 6/2023 |

* cited by examiner

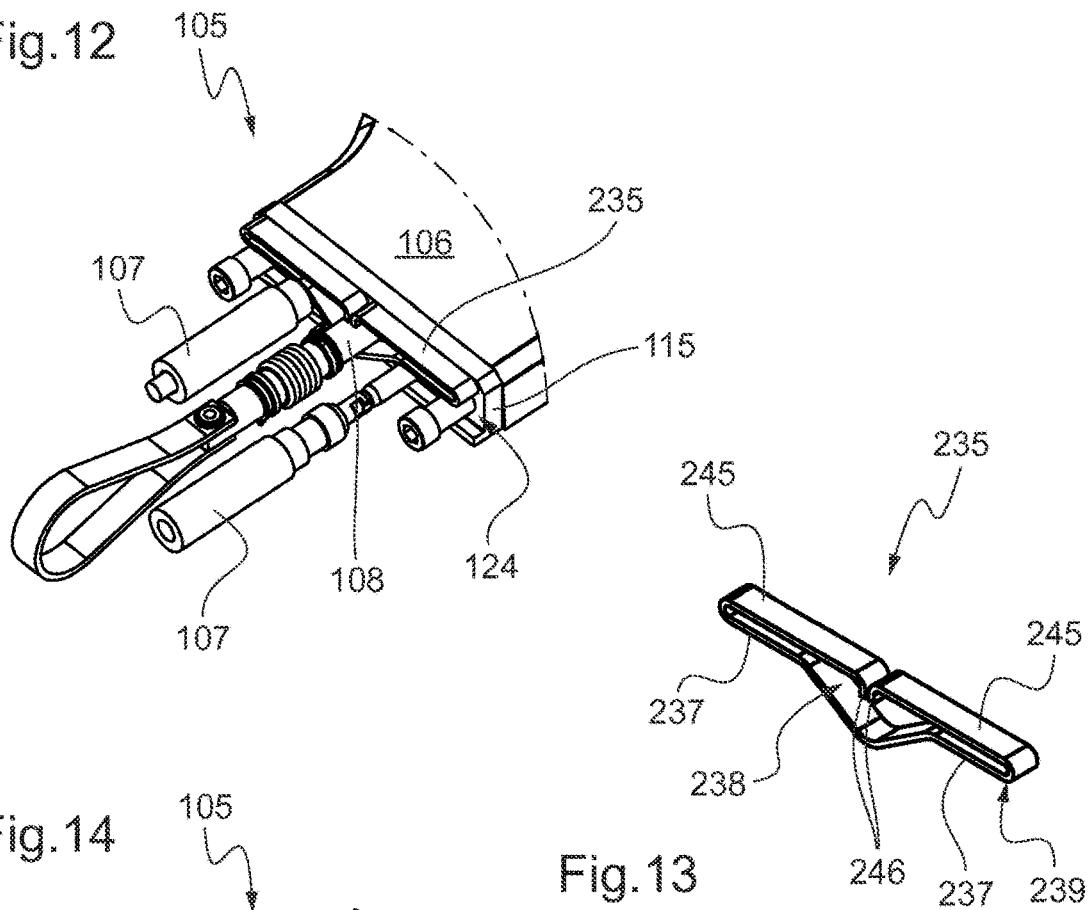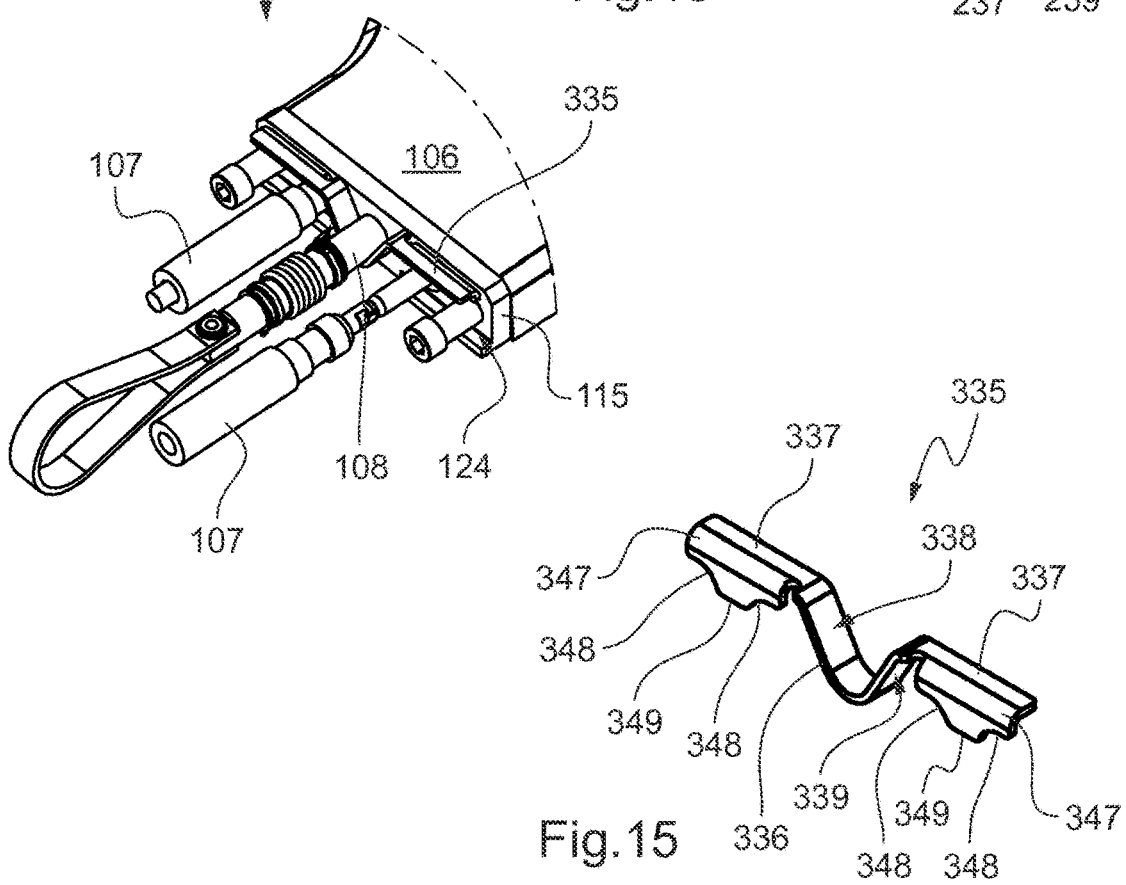

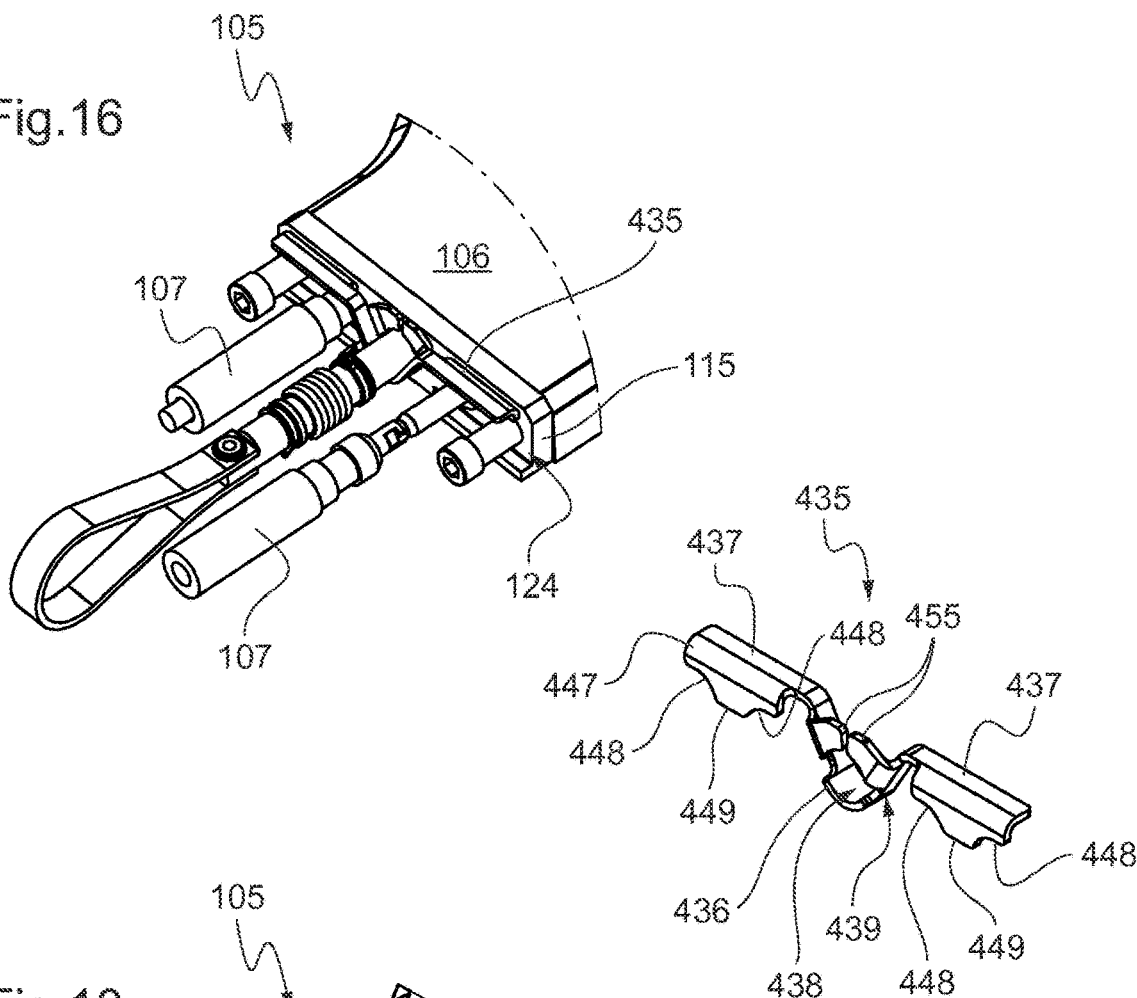
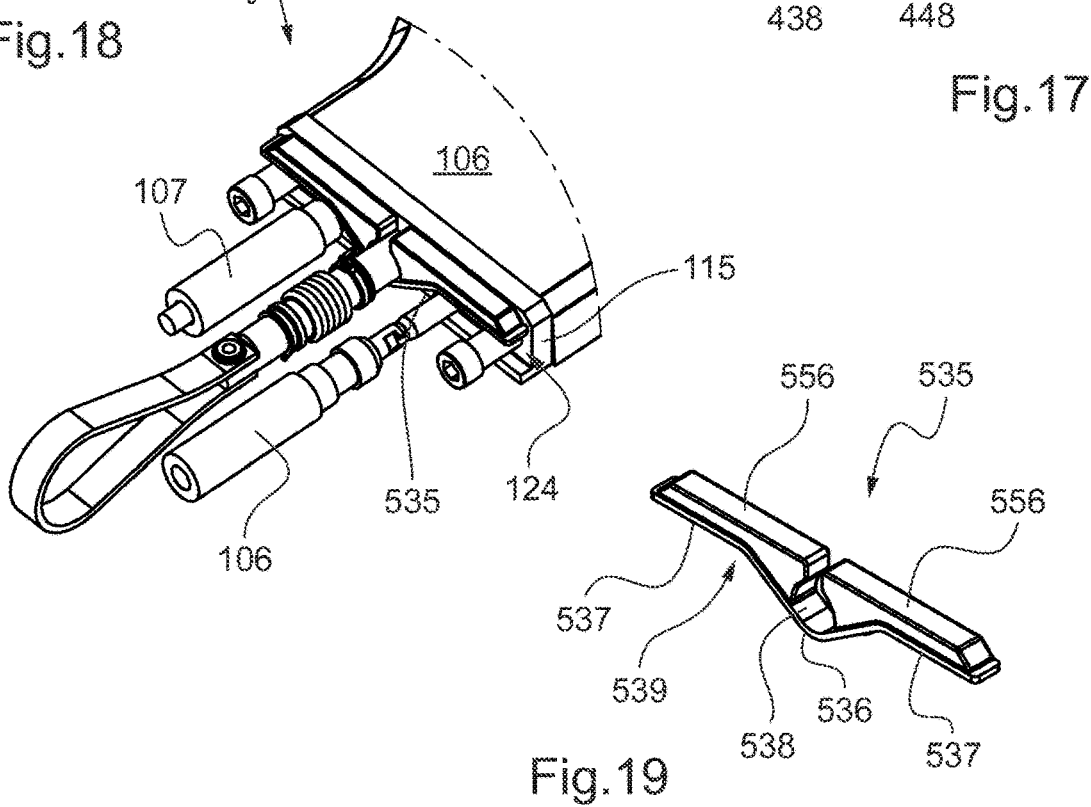

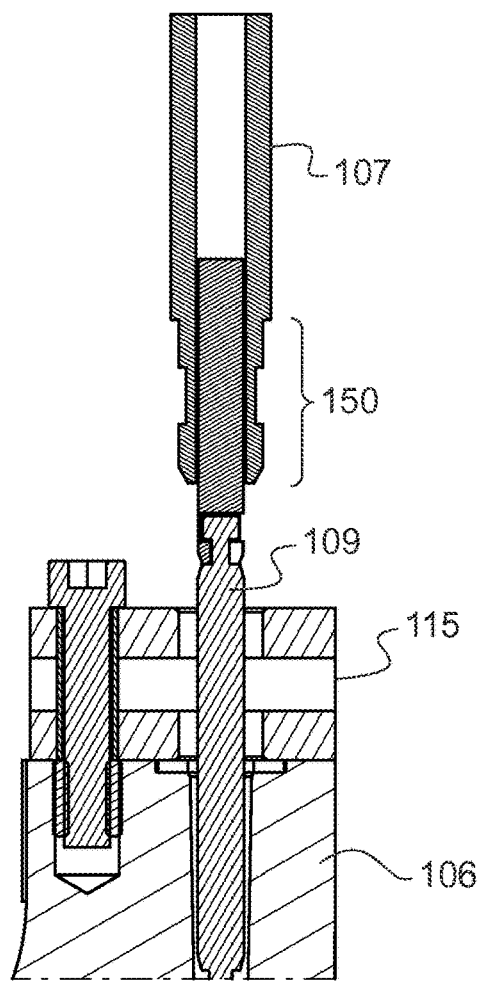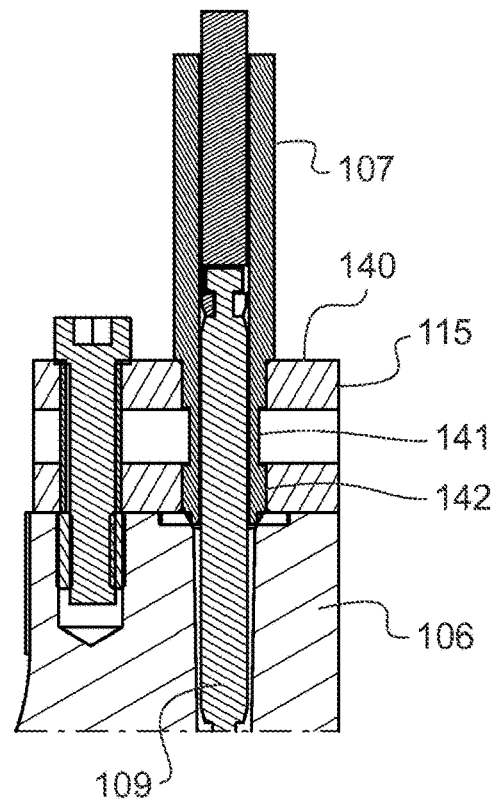
Fig.20    Fig.21
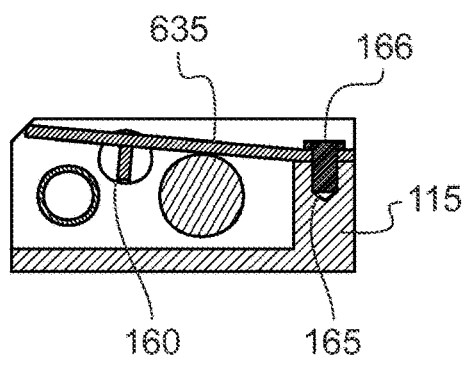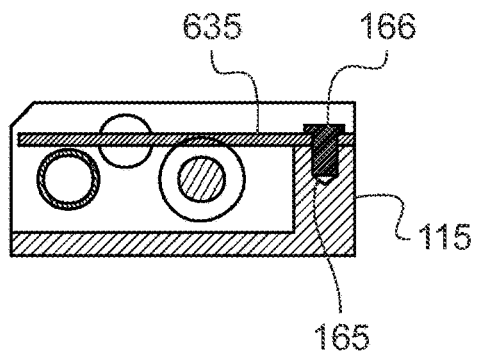
Fig.22    Fig.23

CONTROL MECHANISM FOR A RAIL SYSTEM, RAIL SYSTEM PROVIDED WITH SUCH A MECHANISM AND RAIL VEHICLE PROVIDED WITH SUCH A SYSTEM

CROSS-REFERENCE TO RELATED APPLICATIONS

This application is a U.S. National Stage Entry under 35 U.S.C. § 371 of International Patent Application No. PCT/FR2022/052194, entitled CONTROL MECHANISM FOR A RAIL SYSTEM, RAIL SYSTEM PROVIDED WITH SUCH A MECHANISM AND RAIL VEHICLE PROVIDED WITH SUCH A SYSTEM, filed Nov. 29, 2022, which claims benefit to French Application No. FR2112850, filed Dec. 2, 2021, the entire disclosures of which are hereby incorporated by reference herein.

TECHNICAL FIELD OF THE INVENTION

The invention relates to the field of rail vehicles. It relates more particularly to a control mechanism configured to equip a rail system.

The invention also relates to a system for a rail vehicle provided with at least one item of rail equipment, and a rail vehicle including such a system.

For example, the invention relates to the particular field of braking rail vehicles, and in particular a control mechanism configured to equip a service-brake and/or parking-brake cylinder of a rail braking system, and a rail vehicle including such a braking system configured to act on braking members of the vehicle, such as for example disc brakes or directly on the wheels of the vehicle.

PRIOR ART

In the particular context of rail braking, rail vehicles are generally equipped with braking systems with service-brake and/or parking-brake cylinders, including a piston able to move under the effects of a pressurised fluid, the movement of this piston actuating for example brake rigging and causing a braking action such as the clamping of a brake disc by linings of this rigging or by the application of shoes to wheels of the vehicle.

When the braking system is activated, i.e. when the brake is applied, the rail vehicle can be immobilised. However, it must be possible to deactivate the braking system mechanically and manually, for example in the case of a maintenance operation on the vehicle.

A parking or emergency brake cylinder that is provided with an unlocking device housed in a casing connected to a body of the cylinder is known from the French patent application FR 2 934 981. This unlocking device includes a rod that is connected to a lever housed in the body of the cylinder and itself cooperating with an actuator configured to lock the braking system in its activated state. The rod extends outside the casing and the unlocking device includes an actuation cable mechanically connected to this rod. To unlock the braking system, it suffices to pull on the actuation cable, which drags the rod in translation and causes the lever to tilt so as to make the actuator go into a locking configuration in which the braking system is deactivated and the rail vehicle can be moved.

In particular, FIGS. 1 to 5 of the accompanying drawings show an example of such a cylinder of a braking system mounted on a rail vehicle.

FIG. 1 illustrates in plan view this brake cylinder of the rail braking system provided in particular with a control mechanism and with a control cable configured to cooperate with this mechanism, and a tool actuating the control cable to mechanically connect it to the control mechanism.

FIG. 2 is similar to FIG. 1 but showing the cylinder in side view, with the tool.

FIG. 3 is a partial view in perspective showing in more detail the control cable and the control mechanism not yet assembled, without the tool.

FIG. 4 is a view in partial cross-section showing the control cable mechanically connected to the control mechanism, the cable being in a first position.

FIG. 5 is similar to FIG. 4 except that it shows the cable in a second position different from the first position, in which it actuates the control mechanism.

The rail braking system 1 illustrated on FIGS. 1 and 2 is provided with a brake cylinder 2 on which brake rigging (not shown) can be mounted and is configured to equip a rail vehicle (not shown).

The brake cylinder 2 is supplied by a conveying network of pneumatic pipes, only one pipe 3 of which is visible on FIGS. 1 and 2.

The brake cylinder 2 is formed by a body 4 that is in the form of an overall closed envelope that is configured to be mechanically connected to a support of the vehicle, for example a portion of the bogie or of the axle, via an attachment interface (not shown).

The brake cylinder 2 includes a service brake and/or a parking brake housed in its body 4.

When the service brake and/or the parking brake housed in the body 4 is actuated, the brake rigging is set in motion so as to act on a disc or on a wheel of the rail vehicle.

The brake cylinder 2 can include an actuator configured to lock the service brake and/or the parking brake so as to maintain the braking system in a so-called activated estate representing a braking configuration.

The brake cylinder 2 furthermore includes a control mechanism 5 provided with control members at least partially housed in a casing 6 that is attached to the body 4 of the brake cylinder 2.

In the example illustrated, the rail braking system 1 is provided with a plurality of control cables 7, 8 mechanically connected to the control mechanism 5.

The control members of the control mechanism 5 are provided in particular with control rods 9 that project out of the casing 6 and to which the control cables 7, 8 are mechanically connected.

In the example illustrated, the control cable 8 is said to be central and is connected to a gripping handle 12 located in the immediate vicinity of the body 4. In other words, the central control cable 8 is configured to be actuated by an operator located in the immediate vicinity of the brake cylinder 2 of the rail braking system 1.

In the example illustrated, two so-called offset control cables 7, only one of which is visible, are configured to be mechanically connected to respective control rods 9 located on either side of the control rod to which the central control cable 8 is mechanically connected.

On FIGS. 1 and 2, a tool 10 of the flat spanner type is visible for mechanically connecting the offset control cable 7 to the control mechanism 5, by means of a nut 11 screwed onto a nut coupling 13 of the control mechanism 5.

In particular, FIG. 1 shows that it is necessary to have sufficient space on the side and offset from the cylinder 2 for movement of the tool 10, denoted E on this figure, for the purpose of screwing and/or unscrewing the control cable 7.

As can be seen on FIGS. 3 to 5, the control mechanism 5 is provided with a plate 15 mechanically connected to the casing 6 by fastening members 16, for example of the screw type, and from which the control rod 9 and the nut coupling 13 project.

The control rod 9 is provided at the free end thereof with a first attachment member 17 formed here by a circular groove and surmounted by a disc forming a shoulder; while the control cable 7 is provided with a core 19 having at the free end thereof a second attachment member 18 formed here by a recess for receiving the disc of the control rod and holding walls inserted in the circular groove to lock the disc in the recess and thus the control cable 7 on the control rod 9.

It should be noted that the nut 11 of the control cable 7 is able to move in translation and in rotation about its core 19 along a sheath 20 so that, once the first and second attachment members 17 and 18 are connected to each other, the nut 11 can at least partially slide beyond the second attachment member 18 and be screwed onto a threaded external portion of the nut coupling 13.

The control cable 7 can next act on the control rod 9 and therefore on the control mechanism 5, as can be seen on FIG. 5. In fact, at a distance from the control mechanism 5, if an operator for example actuates a handle (not shown) connected to the core 19 of the control cable 7, in particular by pulling on the core 19 as shown by the arrows on this figure, then the core 19 is driven in translation and draws with it the control rod 9 in the sheath 20, thus acting directly on the control mechanism 5.

The control cable 7 can be designed also to allow the reverse movement of its core 19 and therefore of the control rod 9 in the sheath 20, because of remote action in a direction opposite to that of the arrows on FIG. 5.

DESCRIPTION OF THE INVENTION

The invention relates to a control mechanism configured to equip a rail system, which is simple, convenient and economical.

The object of the invention is thus, in a first aspect, a control mechanism configured to equip a rail system and to act mechanically on mechanical members of this rail system, the control mechanism including a casing from which at least one control rod projects, configured to be mechanically and securely connected to at least one control cable actuatable at a distance from or in proximity to the casing, characterised in that the control mechanism includes a plate mechanically connected to the casing by at least one attachment member and from which the at least one control rod projects, and a locking/unlocking device positioned in a recess provided in the plate and having a stable position, the control mechanism being configured so that, when the at least one control cable is mechanically connected to the at least one control rod, the locking/unlocking device is elastically moved away from its stable position to allow the partial introduction of the at least one control cable in the plate as far as a position in which the at least one control cable is mechanically and securely connected to the at least one control rod.

In the control mechanism according to the invention, the mounting of the control cable on the control rod and the securing of this mounting is facilitated by the presence of the locking/unlocking device that is configured to allow a stable position in which it comes to lock the control cable on the control rod.

In other words, the locking/unlocking device is configured to allow facilitated mounting and secure locked mechanical connection of the control cable on the control rod.

In addition, such a mounting does not necessarily require a large amount of space around the control mechanism.

Such a control mechanism can for example be useful for unlocking the mechanical members of the rail system, and for example the mechanical members of a brake cylinder when the latter is put in an active braking state.

The actuation of the control rod via the control cable may be manual or assisted.

Preferred, simple, convenient and economical features of the control mechanism according to the invention are presented below.

The plate can have a roughly U shape, having a first arm, a second arm located facing the first arm and a bottom wall joining the first arm and the second arm, which delimit the recess, and the first arm is mounted in abutment against the casing while the second arm is opposite the casing, on the same side as the control cable.

The recess can have a main opening that extends longitudinally along the first arm and second arm, and two lateral openings extending between the bottom wall and opposite ends of the main opening.

The plate can be provided with at least one through orifice provided in each of the first arm and second arm, with the control rod projecting from the casing and passing through the space in the plate and each through orifice.

The through orifices have a cross-section larger than that of the control rod so as to receive the control cable.

The plate can be provided with at least one other through orifice provided in the second arm for passage of a tool for acting on the locking/unlocking device in the space in the plate with a view to moving it away from its stable position.

The locking/unlocking device is formed by an elastic member, having an attachment portion and at least one locking portion that extends from the attachment portion, and the locking/unlocking device can be positioned in the recess in the plate so that the control rod to which the control cable is mechanically connected is located against the locking portion on a second side of the elastic member.

The locking/unlocking device can be positioned in the recess in the plate so that the locking portion is at least partially located facing the other orifice provided in the plate.

The locking/unlocking device can have at least one top portion that extends from the at least one locking portion and is bent so as to be facing a first side of the locking/unlocking device, opposite to the second side, with the top portion being positioned substantially flush with a longitudinal main opening in the plate.

The locking/unlocking device can have at least one folded-over portion that extends from the at least one locking portion and is bent so as to be directed from the second side of the locking/unlocking device, with the at least one folded-over portion being provided with free edges, including a straight edge and at least one curved edge, with the curved edge allowing passage of the control cable, and the straight edge being configured to be inserted in a groove formed on the control cable so as to lock the positioning of the latter.

The locking/unlocking device can be provided with two substantially straight locking portions that extend on either side of the attachment portion, and two safety lugs that each project from the attachment portion on a first side of the locking/unlocking device and in the direction of an opposite locking portion, with the safety lugs extending opposite each other so that they come into abutment against each other when the locking/unlocking device is elastically stressed by separating the locking portions.

The locking/unlocking device can be provided with two substantially straight locking portions that extend on either side of the attachment portion, and two abutment pieces that are mechanically connected on a first side of the locking/unlocking device and cover the locking portions completely and the attachment portion partially, with the abutment pieces being configured so that they come into abutment against each other when the locking/unlocking device is elastically stressed by separating the locking portions.

The abutment pieces can be sufficiently thick so that, when the locking/unlocking device is positioned in the recess in the plate, they are positioned substantially flush with a longitudinal main opening in the plate.

The control rod can be provided at a free end with a first attachment member and the control cable can be provided with a core surrounded by a sheath and having, at a free end of the core, a second attachment member configured to be mechanically connected to the first attachment member, and the control cable can be provided with an attachment zone formed at one end of the sheath, said attachment zone being able to have at least a first thinned portion, a second thinned portion extending from the first end portion, and a third thinned portion extending from the second thinned portion and having a free edge, with the second thinned portion having a cross-section less than those of the first thinned portion and of the third thinned portion so that it forms a groove at the end of the sheath, and the attachment zone, together with the sheath, is able to move in translation with respect to the core and to the second attachment member.

When the second attachment member of the control cable is mechanically connected to the first attachment member of the control rod, the attachment zone of the control cable is slid so as to pass through an orifice provided in the plate until it comes into contact with a locking portion of the locking/unlocking device, the third thinned portion elastically stresses the locking portion with its free edge so as to move it away and thus leave free the passage at least of the third thinned portion and of the second thinned portion in the space in the plate, and the attachment zone slides until the third thinned portion is sufficiently sunk in the plate for the locking portion to return to the stable position in the groove formed by the second thinned portion in the sheath of the control cable.

The attachment zone can slide until it positions the first thinned portion at least partially in the space in the plate and thus having the rest of the sheath, the cross section of which is larger than the first thinned portion, coming into abutment substantially against the plate.

Another object of the invention, in a second aspect, is a rail system for a rail vehicle provided with at least one mechanical actuation member having a control mechanism like the one described above and to which the at least one control cable is mechanically and securely connected.

Another object, in a third aspect, is a rail vehicle including a system as described above, which is configured to act on mechanical members of the vehicle and the control mechanism of which is configured to unlock the rail system by actuation of the control cable.

BRIEF DESCRIPTION OF THE FIGURES

The disclosure of the invention will now be continued with the description of example embodiments, given hereinafter by way of illustration and non-limitatively, with reference to the accompanying drawings.

FIG. 12 is a view similar to the one in FIG. 7, showing the control mechanism with a locking/unlocking device in accordance with a first variant embodiment.

FIG. 13 illustrates in perspective and in isolation the locking/unlocking device visible on FIG. 12.

FIG. 14 is a view similar to those in FIGS. 7 and 12, showing the control mechanism with a locking/unlocking device in accordance with a second variant embodiment.

FIG. 15 illustrates in perspective and in isolation the locking/unlocking device visible on FIG. 14.

FIG. 16 is a view similar to those in FIGS. 7, 12 and 14, showing the control mechanism with a locking/unlocking device in accordance with a third variant embodiment.

FIG. 17 illustrates in perspective and in isolation the locking/unlocking device visible on FIG. 16.

FIG. 18 is a view similar to those in FIGS. 7, 12 and 14 and 16, showing the control mechanism with a locking/unlocking device in accordance with a fourth variant embodiment.

FIG. 19 illustrates in perspective and in isolation the locking/unlocking device visible on FIG. 18.

FIG. 20 is a view in partial longitudinal section of a control mechanism with a locking/unlocking device according to a fifth variant embodiment and a control cable attached but not locked.

FIG. 21 is similar to FIG. 20 except that the control cable is locked.

FIG. 22 is a view in partial cross-section of the control mechanism in FIG. 20, with a tool that actuates the locking/unlocking device.

FIG. 23 is similar to FIG. 22 with the control cable locked and without tool.

DETAILED DESCRIPTION

Figure 1:
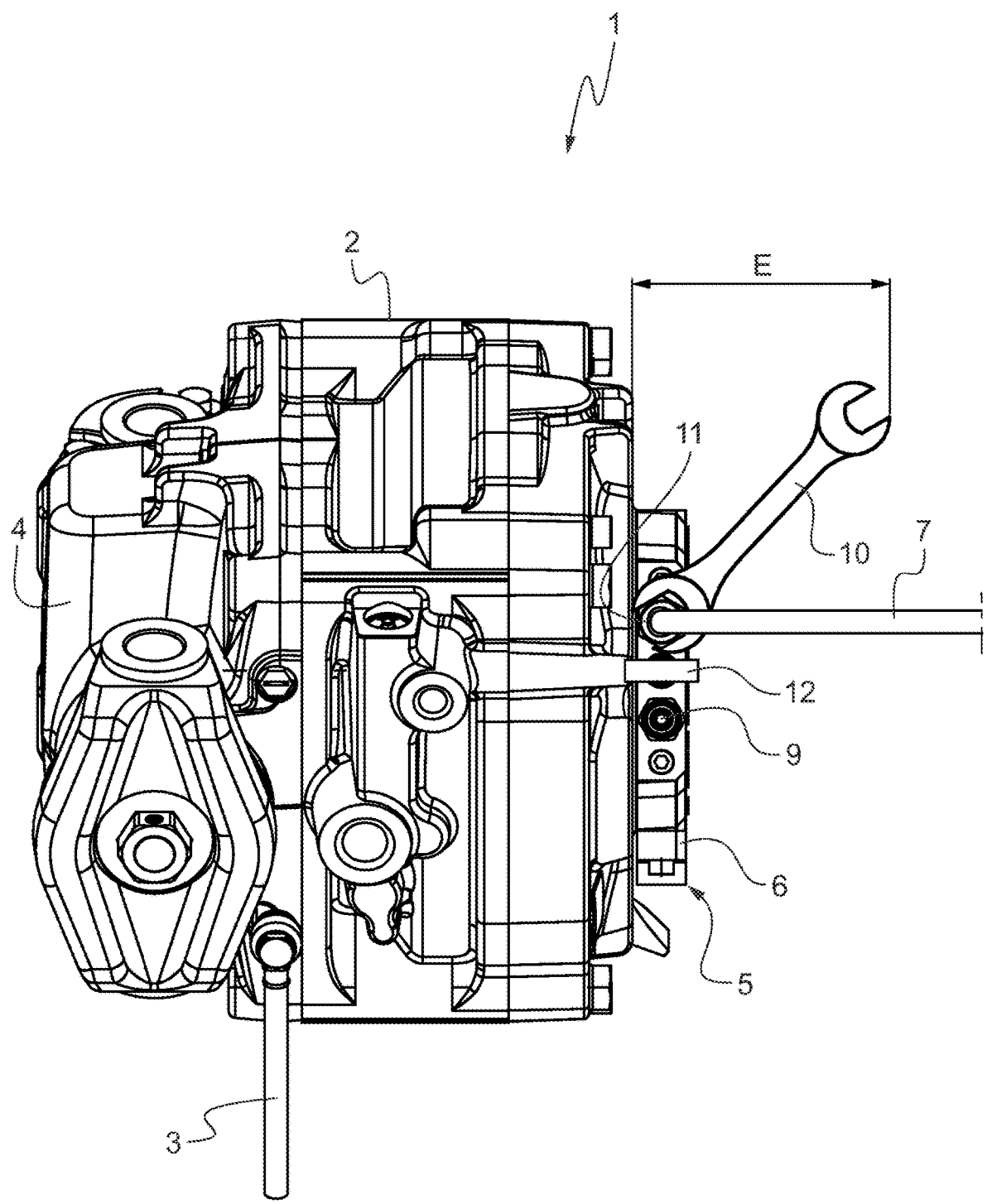
FIG. 1 described above illustrates in plan view this brake cylinder of the rail braking system provided in particular with the control mechanism and with a control cable configured to cooperate with this mechanism, and a tool actuating the control cable to mechanically connect it to the control mechanism.
Figure 2:
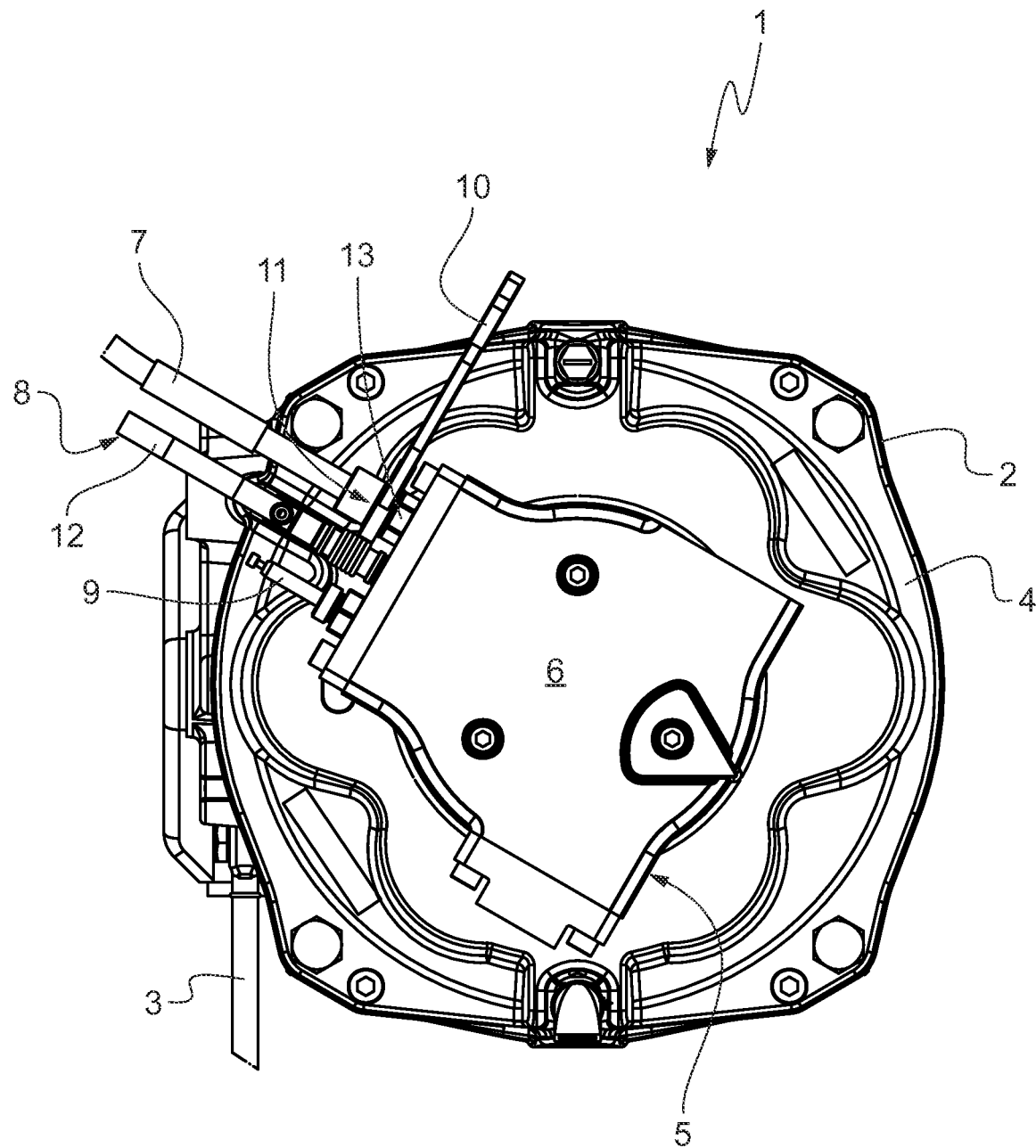
FIG. 2 described above is similar to FIG. 1 but showing the cylinder in a side view, with the tool.
Figure 3:
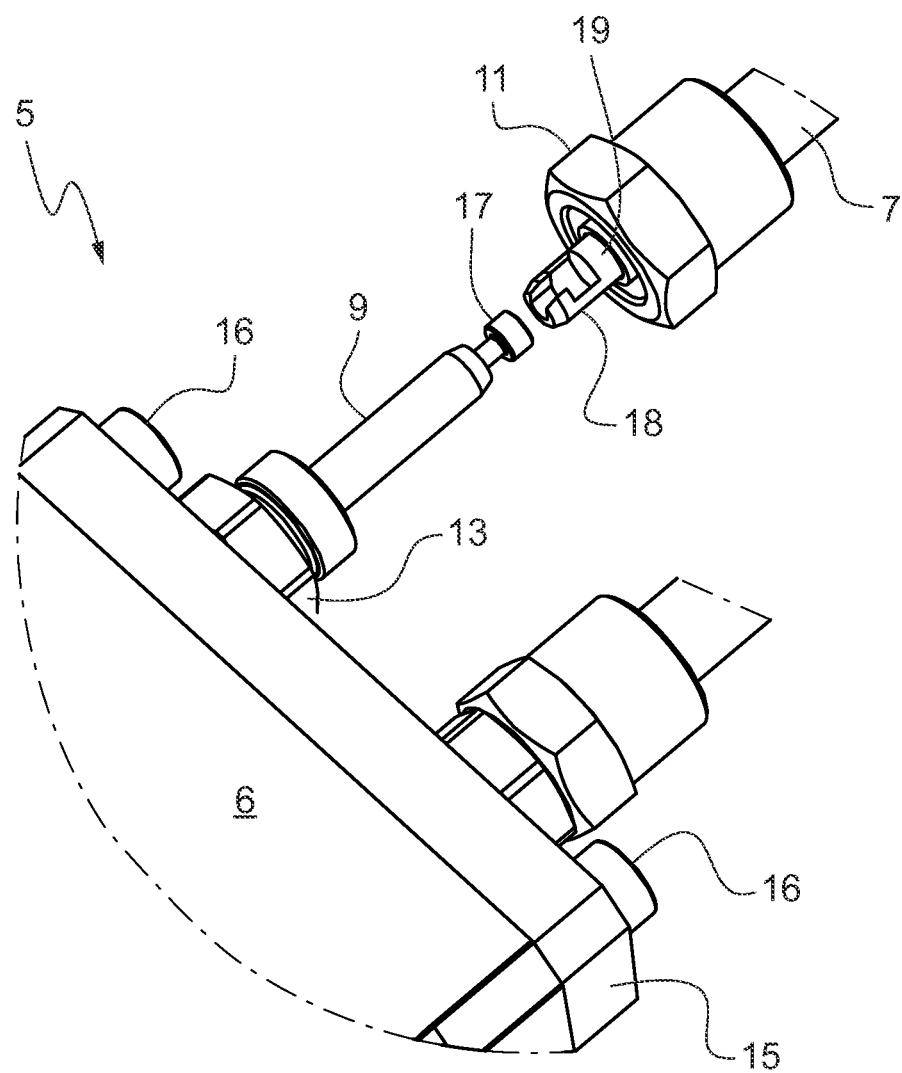
FIG. 3 described above is a partial view in perspective showing in more detail the control cable and the control mechanism not yet assembled, without the tool.
Figure 4:
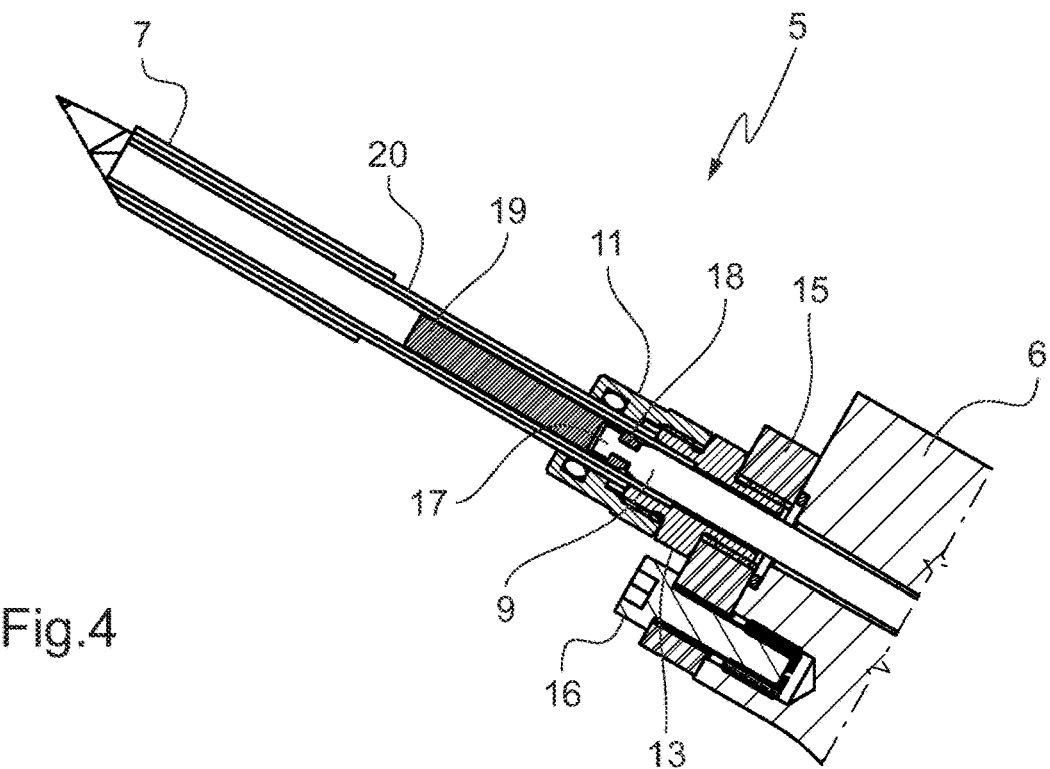
FIG. 4 described above is a view in partial cross-section showing the control cable mechanically connected to the control mechanism, the cable being in a first position.
Figure 5:
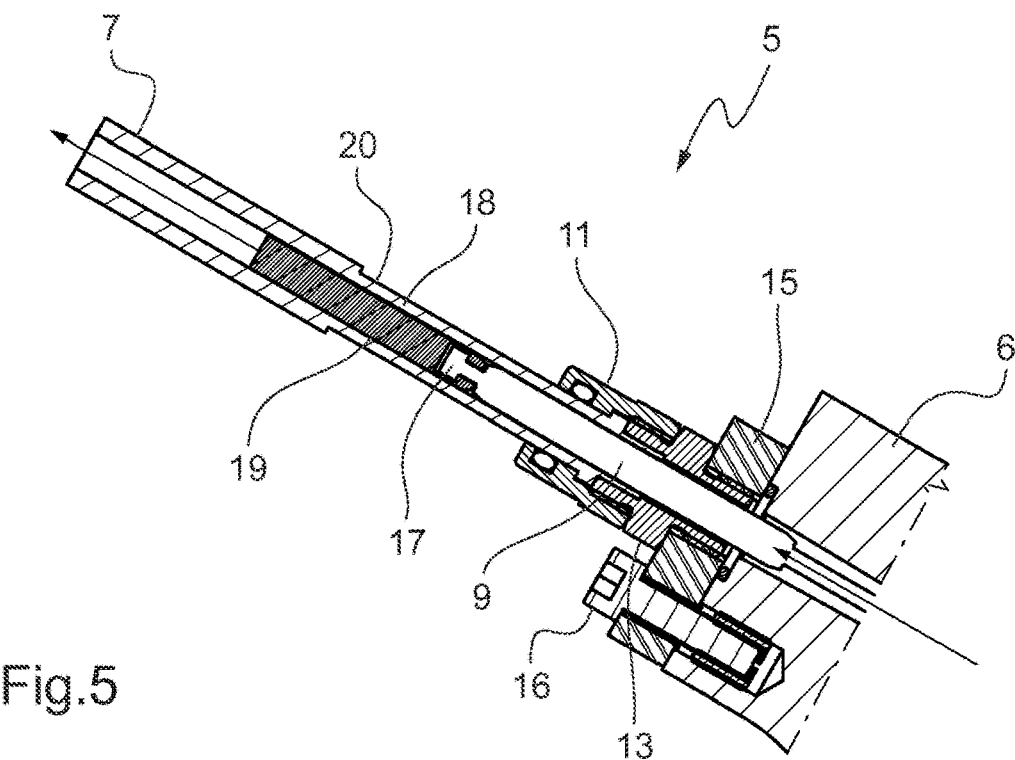
FIG. 5 described above is similar to FIG. 4 except that it shows the cable in a second position different from the first position, in which it actuates the control mechanism.
Figure 6:
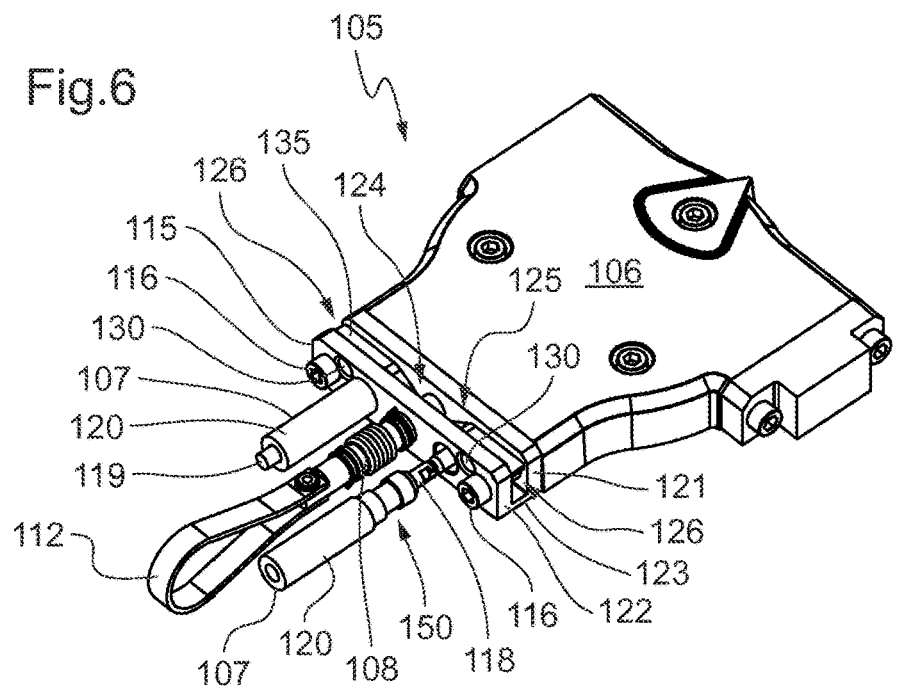
FIG. 6 illustrates in perspective and in isolation, a control mechanism configured to equip a rail system, including for example a brake cylinder as described with reference to FIGS. 1 to 5, with a plurality of control cables and in accordance with an embodiment of the invention.
Figure 7:
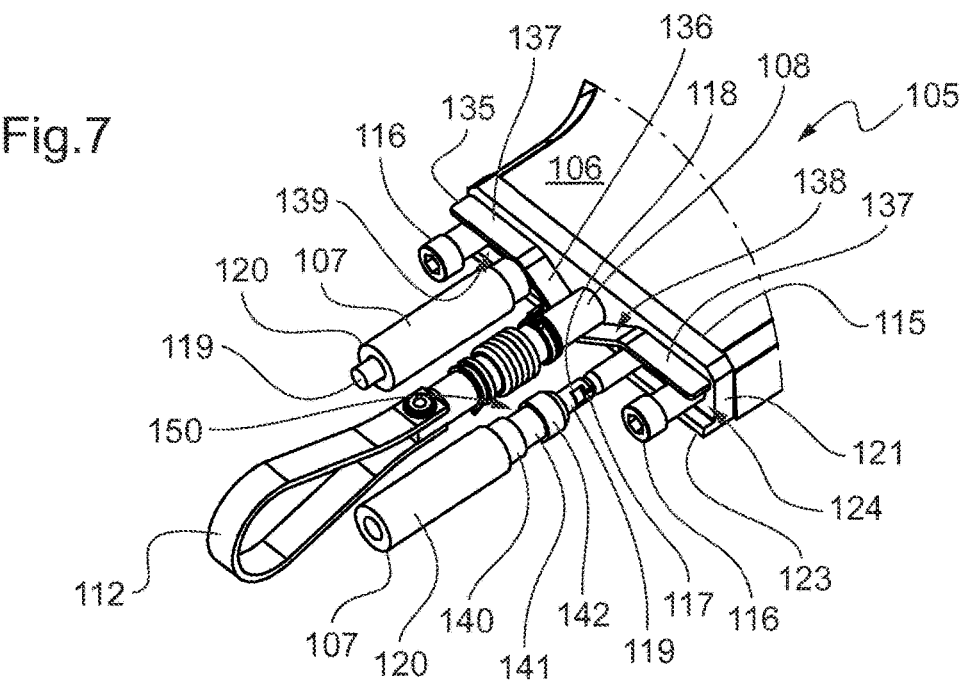
FIG. 7 is a view similar to the one in FIG. 6, showing only partially the control mechanism, with a locking/unlocking device support shown partially cut away.
Figure 8:
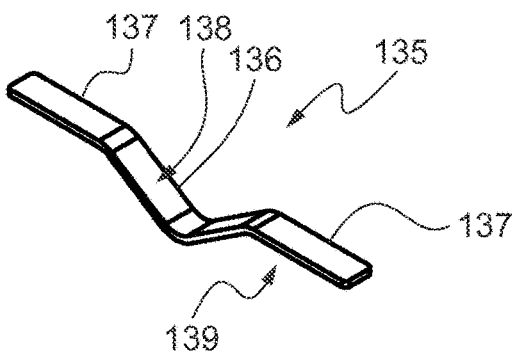
FIG. 8 illustrates in perspective and in isolation a locking/unlocking device of the control mechanism visible on FIGS. 6 and 7.
Figure 9:
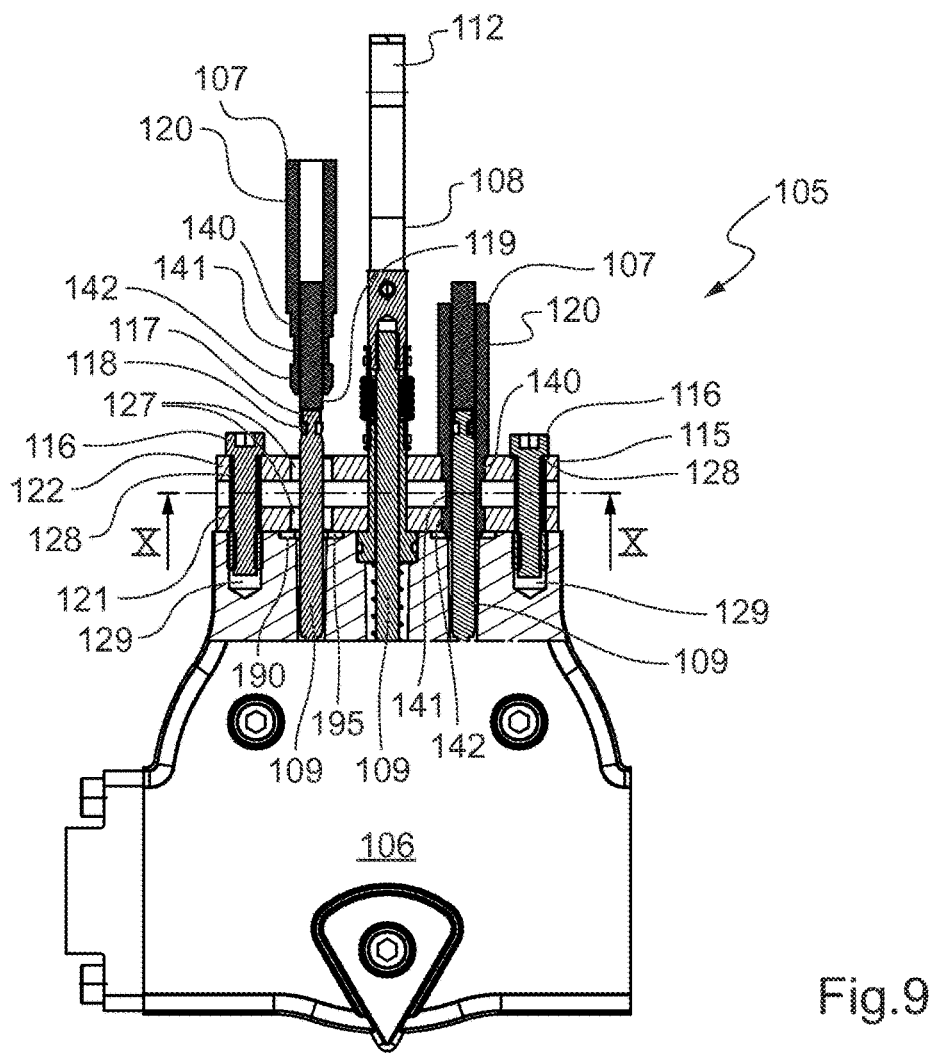
FIG. 9 is a view in partial longitudinal medial section of the control mechanism in FIG. 6.
Figure 10:
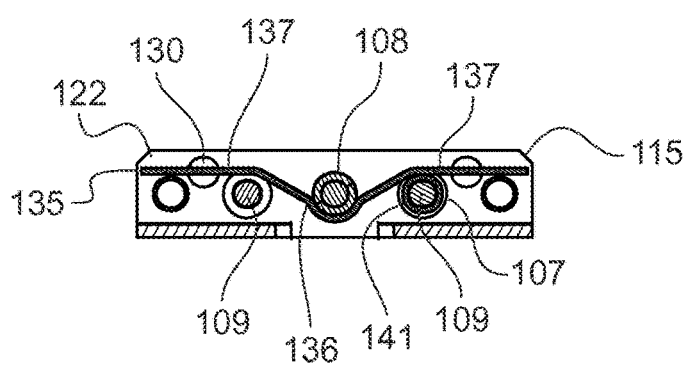
FIG. 10 is a view in cross section marked X-X on FIG. 9.

As explained above, FIGS. 1 to 5 illustrate a service-brake and parking-brake cylinder equipping a rail braking system of the prior art.

However, the following description of FIGS. 6 to 23 relates to a control mechanism 105 that is configured to be mounted on a rail system, and for example on a brake cylinder of a rail braking system as described above, instead of the control mechanism described with reference to these figures.

A less detailed description, based on the one made in the part reflecting the prior art, will therefore be made of such a cylinder for a rail braking system before describing in more detail the control mechanism 105 visible on FIGS. 6 to 23.

Naturally, the control mechanism 105 can more generally be mounted on a rail system or equipment not necessarily relating to braking. To simplify the present memorandum, it is however in the context of braking that the system on which the mechanism is mounted is described.

In the field of rail braking, it can be a case of a rail braking system provided with a brake cylinder on which brake rigging can be mounted and which is configured to equip a rail vehicle.

The brake cylinder can be supplied by a conveying network of pneumatic pipes. The brake cylinder can be formed by a body that is in the form of an overall closed envelope that is configured to be mechanically connected to a support of the vehicle, for example a portion of the bogie or of the axle, via an attachment interface.

The brake cylinder can include a service brake and/or a parking brake housed in its body. When the service brake and/or the parking brake housed in the body is actuated, the brake rigging can be set in motion so as to act on a disc or on a wheel of the rail vehicle. The brake cylinder can include an actuator configured to lock the service brake and/or the parking brake so as to maintain the braking system in a so-called activated estate representing a braking configuration.

The brake cylinder is provided with the control mechanism 105 in accordance with the invention and which is now described with reference to FIGS. 6 to 11.

The control mechanism 105 provided with control members which are at least partially housed in a casing 106 configured to be attached to the body of the brake cylinder.

In the example illustrated, a plurality of control cables 107, 108 are mechanically connected to the control mechanism 105.

The control members of the control mechanism 105 are provided in particular with control rods 109 that project out of the casing 106 and to which the control cables 107, 108 are mechanically connected.

In the example illustrated, the control cable 108 is said to be central and is connected to a gripping handle 112 located in the immediate vicinity of the casing 106. In other words, the central control cable 108 is configured to be actuated by an operator located in the immediate vicinity of the brake cylinder of the rail braking system.

In the example illustrated, two so-called offset control cables 107 are configured to be mechanically connected to respective control rods 109 located on either side of the control rod to which the central control cable 108 is mechanically connected.

The control mechanism 5 is provided with a plate 115 mechanically connected to the casing 106 by fastening members 116, for example of the screw type, and from which the control rods 109 project.

The plate 115 is here roughly in a U shape, having a first arm 121, a second arm 122 located facing the first arm 121 and a bottom wall 123 joining the first and second arms 121 and 122.

The plate 115 thus has a recess 124 delimited by the first and second arms 121 and 122 and by the bottom wall 123.

The recess 124 has here a main opening 125 that extends longitudinally along the first and second arms 121 and 122, and two lateral openings 126 extending between the bottom wall 123 and opposite ends of the main opening 125.

The first arm 121 is here mounted in abutment against the casing 106, while the second arm 122 is located opposite the casing 106, on the same side as the control cables 107 and 108.

The plate 115 is provided with a plurality of through orifices that are provided in each of the first and second arms 121 and 122.

In particular, the control rods 109 project from the casing 106 and pass through the first orifices 127 provided in pairs in the first and second arms 121 and 122.

In the example illustrated, the first orifices 127 have a larger cross-section than that of the control rods 109.

The members 116 securing the plate 115 on the casing 106 for their part pass through the second orifices 128 also provided in pairs in the first and second arms 121 and 122 and are mechanically connected in threaded holes 129 provided in the casing 106.

Third through orifices 130 are furthermore provided in the second arm 121 and 122 for a tool to pass as described in more detail below.

Throats 190 are furthermore provided on a face of the casing 106 against which the first arm 121 of the plate rests, so that the throats coincide partially with the first orifices 127 provided in this first arm 121.

Sealing members 195, here of the flat gasket type, are received in the throats 190.

The control mechanism 5 is furthermore provided with a locking/unlocking device 135 positioned in the recess 124 in the plate 115.

The locking/unlocking device 135 is configured to allow facilitated mounting and secure locked mechanical connection at least of the control cables 107 on the control rods 109.

The locking/unlocking device 135 is here in the form of an elastic metal blade, having an attachment portion 136 that is curved in the example illustrated, and two locking portions 137 that are here substantially straight and extend on either side of the attachment portion 136.

In particular, the locking/unlocking device 135 is positioned in the recess 124 in the plate 115 so that the control rod 109 to which the control cable 108 is mechanically connected is located against the attachment portion 136 on a first side 138 of the elastic metal blade, and the control rods 109 to which the control cables 107 are mechanically connected are located against the locking portions 137 on a second side 139 of the elastic metal blade, which is opposite to the first side 138.

The locking/unlocking device 135 is positioned in the recess 124 in the plate 115 so that also the locking portions 137 are respectively at least partially located facing the first orifices 137 provided in the plate 115.

The control rods 109, which are configured to be mechanically connected to the offset control cables 107, are each provided at their free end with a first attachment member 117 formed for example here by a second groove and surmounted by a disc forming a shoulder. These control rods 109 project from the second arm 122 through the first orifices 127.

The offset control cables 107 are each provided with a core 119 surrounded by a sheath 120 and having, at its free end, a second attachment member 118 formed here by a recess for receiving the disc of the first attachment member 117 of the respective control rod 109 and holding walls inserted in the circular groove of the first attachment member 117 to lock the disc in the recess and thus the control cable 107 on the respective control rod 109.

The offset control cables 107 are furthermore each provided with an attachment zone 150 formed at the end of their respective sheath 120.

The attachment zone 150 of each offset control cable 107 has in the example illustrated a first thinned portion 140, a second thinned portion 141 extending from the first thinned portion 140, and a third thinned portion 142 extending from the second thinned portion 141 and having a free edge, for example substantially bevelled.

The second thinned portion 141 has a cross-section less than those of the first thinned portion 140 and third thinned portion 142 so that it forms a groove at the end of the sheath 120.

This attachment zone 150, together with the sheath 120, is able to move in translation with respect to the core 119 and second attachment member 118.

The locking of the offset control cables 107 on the control mechanism 105 is implemented as follows.

When the second attachment member 118 of the respective offset control cable 107 is mechanically connected to the first attachment member 117 of the respective control rod 109, the attachment zone 150 of the respective offset control cable 107 is slid so as to pass through a respective first orifice 127 in the second arm 122 of the plate 115 until it comes into contact with a locking portion 137 of the locking/unlocking device 135.

In particular, the third thinned portion 142 acts elastically on the locking portion 137 with its bevelled free edge so as to move it away and no longer be facing the first orifice 127, and thus leave free the passage at least of the third thinned portion 143 and of the second thinned portion 141 in the space 124 of the plate 115.

The attachment zone 150 slides until the third thinned portion 142 is sufficiently sunk in the plate 115 for the locking portion 137 to return to the stable position in the groove formed by the second thinned portion 141 in the sheath 120 of the respective offset control cable 107.

The attachment zone 150 can slide until it positions the third thinned portion 142 in the corresponding first orifice 127 in the first arm 121 of the plate 115.

Furthermore, the third thinned portion 142 comes into abutment against a respective sealing member 195 housed in the respective throat 190.

In addition to a sealing function, the sealing member 195 can fulfil the role of damper by slightly urging the third thinned portion 142 and therefore the sheath 120 counter to the locking portion 137 of the locking/unlocking device 135.

The attachment zone 150 can slide until it positions the first thinned portion 140 at least partially in the space 124 in the plate 115 and thus having the rest of the sheath 120, the cross section of which is larger than the first thinned portion 140, coming into abutment substantially against the second arm 122 of the plate 115.

The respective offset control cable 107 is then positioned and locked on the control mechanism 105 through the action of a respective locking portion 137 of the locking/unlocking device 135.

The offset control cables 107 can thus act on the respective control rods 109 and therefore on the control mechanism 105. In fact, at a distance from the control mechanism 105, if an operator for example actuates a handle (not shown) connected to the core 119 of the control cable 107, in particular by pulling on the core 119, then the latter is driven in translation and draws with it the control rod 109 in the sheath 120, thus acting directly on the control mechanism 105.

The control cables 107 can be designed also to allow the reverse movement of their respective core 119 and therefore of the control rod 109 in the sheath 120, because of remote action in an opposite direction.

It will be noted that the assembly described above offers the possibility of having a control cable 107 possibly free to rotate with respect to the plate 115 and therefore with respect to the recess 106, even when it is locked axially on the control rod 109.

To extract the offset control cable 107 from the plate 115, or also to introduce it into the plate 115, it is possible to force the respective locking portion 137 of the locking/unlocking device 135 to move away from its stable position by acting on it manually.

Figure 11:
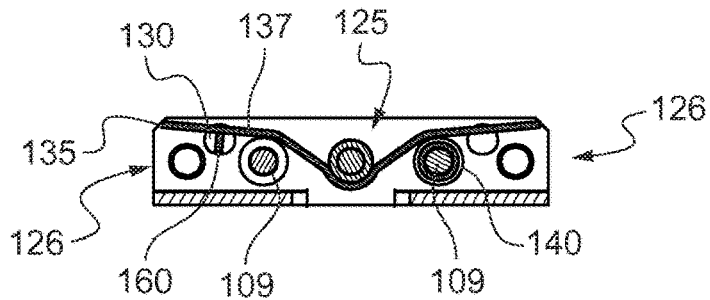
FIG. 11 is similar to FIG. 10 except that the locking/unlocking device of the control mechanism is actuated by means of a tool.

In particular, it is possible to use a tool 160, in particular a screwdriver the tip of which is visible on the left-hand part of FIG. 11, by introducing it into a third through orifice 130 provided in the second arm 122 of the plate 115.

In a variant, it is possible to act on the respective locking portion 137 of the locking/unlocking device 135 by passing directly through a respective lateral opening 126, with or without the aid of a tool. This is what is visible, without a tool, on the right-hand part of FIG. 11.

FIG. 11 also shows, on its right-hand part, the withdrawal of the control cable 107, at the moment when the respective locking portion 137 of the locking/unlocking device 135 is acted on by the third thinned portion 142.

FIGS. 12 and 13 show a first variant embodiment of a locking/unlocking device 235, positioned in the space 124 in the plate 115 mounted on the casing 106 of the control mechanism 105 and configured to cooperate with the control cables 107 and 108.

Like the locking/unlocking device 135, the locking/unlocking device 235 is here in the form of an elastic metal blade, having an attachment portion 236 that is curved in the example illustrated, and two locking portions 237 that are here substantially straight and extend on either side of the attachment portion 236.

The locking/unlocking device 235 furthermore has two upper portions 245 that each extend from a respective locking portion 237 and are bent so as to be facing the first side 238 of the locking/unlocking device 235.

The two upper portions 245 are provided with free edges 246 turned towards the attachment portion 236.

In particular, the locking/unlocking device 235 is positioned in the recess 124 in the plate 115 as explained with reference to FIGS. 6 to 11. The two upper portions 245 are positioned substantially flush with the longitudinal main opening in the plate 115. This makes it possible in particular to check that the control cables 107 are indeed engaged on the control mechanism 105.

FIGS. 14 and 15 show a second variant embodiment of a locking/unlocking device 335, positioned in the space 124 in the plate 115 mounted on the casing 106 of the control mechanism 105 and configured to cooperate with the control cables 107 and 108.

Like the locking/unlocking device 135, the locking/unlocking device 335 is here in the form of an elastic metal blade, having an attachment portion 336 that is curved in the example illustrated, and two locking portions 337 that are here substantially straight and extend on either side of the attachment portion 336.

The locking/unlocking device 335 furthermore has two folded-over portions 347 that each extend from a respective locking portion 337 and are bent so as to be directed on the second side 339 of the locking/unlocking device 335, opposite to the first side 338, and towards the bottom wall of the plate 115.

The locking/unlocking device 335 is positioned in the recess 124 in the plate 115 as explained with reference to FIGS. 6 to 11.

The locking/unlocking device 335 is configured so that the two folded-over portions 347 are located facing the first arm of the plate 115.

The two folded-over portions 347 are provided with free edges, including a straight edge 349 interposed between two curved edges 348, with the curved edge 348 furthest away from the attachment portion 336 allowing passage of the attachment member, the curved edge 348 closest to the attachment portion 336 allowing passage of the third thinned portion of the sheath of the respective control cable 107, and the straight edge 349 being configured to be inserted in the groove formed on the sheath by the presence of the second thinned portion, so as to lock the positioning of the control cable 107.

FIGS. 16 and 17 show a third variant embodiment of a locking/unlocking device 435, positioned in the space 124 in the plate 115 mounted on the casing 106 of the control mechanism 105 and configured to cooperate with the control cables 107 and 108, as explained with reference to the preceding figures.

The locking/unlocking device 435 is similar to the one visible on FIGS. 14 and 15 in that it is in the form of an elastic metal blade having an attachment portion 436 that is curved in the example illustrated, and two locking portions 437 that are here substantially straight and extend on either side of the attachment portion 436; in that it is provided with two folded-over portions 447 that each extend from a respective locking portion 437 and are bent so as to be directed on the second side 439 of the locking/unlocking device 435, opposite to the first side 438, and towards the bottom wall of the plate 115, in that the two folded-over portions 447 are located facing the first arm of the plate 115, and in that the two folded-over portions 447 are provided with free edges, including a straight edge 449 interposed between two curved edges 448, with the curved edge 448 furthest away from the attachment portion 436 allowing passage of the attachment member, the curved edge 448 closest to the attachment portion 436 allowing passage of the third thinned portion of the sheath of the respective control cable 107, and the straight edge 449 being configured to be inserted in the groove formed on the sheath by the presence of the second thinned portion, so as to lock the positioning of the control cable 107.

In addition, the locking/unlocking device 435 is provided with two safety lugs 455 that each project from the attachment portion 436, on the first side 438, and in the direction of an opposite locking portion 437.

The safety lugs 455 extend facing each other so that they come into abutment against each other when the locking/unlocking device 435 is stressed elastically while separating the locking portions 437 from the bottom wall of the plate 115. In other words, the safety lugs 455 make it possible to limit the separation of the locking portions 437.

FIGS. 18 and 19 show a fourth variant embodiment of a locking/unlocking device 535, positioned in the space 124 in the plate 115 mounted on the casing 106 of the control mechanism 105 and configured to cooperate with the control cables 107 and 108.

The locking/unlocking device 535 is here similar to the one visible on FIGS. 6 to 11 in that it is in the form of an elastic metal blade, having an attachment portion 436 that is curved in the example illustrated, and two locking portions 437 that are here substantially straight and extend on either side of the attachment portion 436.

In addition, the locking/unlocking device 535 is provided with abutment pieces 556 produced here from elastomer, which are mechanically connected on the first side 538 of the locking/unlocking device 535.

In particular, the abutment pieces 556 completely cover the locking portions 537 and partially cover the attachment portion 536. A space is kept at the attachment portion 536 for passage of the central control cable 108 and/or of the associated control rod.

The abutment pieces 556 are configured so that they come into abutment against each other when the locking/unlocking device 535 is stressed elastically while separating the locking portions 537 from the bottom wall of the plate 115. In other words, the abutment pieces 556 make it possible to limit the separation of the locking portions 537.

Furthermore, the abutment pieces 556 are, in the example illustrated, sufficiently thick so that, when the locking/unlocking device 535 is positioned in the recess 124 in the plate 115, as explained with reference to FIGS. 6 to 11, they are positioned substantially flush with the longitudinal main opening in the plate 115. This makes it possible in particular to check that the control cables 107 are indeed engaged on the control mechanism 105.

FIGS. 20 to 23 show a fifth variant embodiment of a locking/unlocking device 635.

FIGS. 20 and 21 show the mounting of a control cable 107 on a control rod 109, as explained with reference to FIGS. 6 to 11.

In particular, the attachment zone 150 of the control cable 107 slides until it positions the third thinned portion 142 in the corresponding first orifice in the first arm of the plate 115 and the first thinned portion 140 at least partially in the space 124 in the plate 115, and thus having the rest of the sheath, the cross section of which is larger than the first thinned portion 140, coming into abutment substantially against the second arm of the plate 115, and the second thinned portion 141 being located between the first and second arms of the plate.

In this position, the second thinned portion 141 is locked by the locking/unlocking device 635 that is formed by an elastic metal blade.

The locking/unlocking device 635 is mechanically connected by an attachment member 166 in an orifice 165 provided in a lateral wall of the plate 115, and the elastic metal blade is moved away from its stable position as from the attachment thereof to the plate.

As can be seen on FIG. 22, it is possible to use a tool 160, in particular a screwdriver the tip of which is visible, by introducing it into a third through orifice provided in the second arm of the plate 115.

Variants that are not illustrated are described below.

The elastic member of the locking/unlocking device is not formed by a metal blade, but is rather produced from plastics material or composite.

The elastic member of the locking/unlocking device is not in the form of a longitudinal blade as illustrated on the figures, but rather in a square or round shape, wider than long, or any other shape making it possible to provide sufficient locking force on the control cable and having elastic properties and therefore flexibility of manoeuvre adapted to the use described above.

The locking/unlocking device has a single locking portion.

The first and second attachment members may be formed differently, it may be a case of clips or hooks.

The control mechanism may include more or fewer control cables.

The attachment zone may be formed by a part distinct from the sheath.

The attachment zone may not have a first thinned portion, or the first thinned portion may be coincident with the rest of the sheath.

The sheath may be positively located on the plate so as to lock the control cable also with respect to rotation, for example by means of a flat provided on a portion of the sheath, or by means of an attached part of the pin type or equivalent.

In the field of rail braking, rather than being mounted on a brake cylinder, the control mechanism may be mounted on a member itself configured to act for example on a control valve or a selector of operating modes or other equipment that might for example need to be isolated.

In fields other than that of braking, the control mechanism may be mounted on a member itself configured to act for example on a compressor drain, a suspension control module, a dead-man detection module, but also pantograph actuation mode or a mechanism for unlocking a rail vehicle door.

More generally, the invention is not limited to the examples described and depicted.

The invention claimed is:

1. A control mechanism configured to equip a rail system and to act mechanically on mechanical members of the rail system, the control mechanism comprising:
a casing from which at least one control rod projects, and wherein the casing is configured to mechanically and securely connected to at least one control cable actuatable at a distance from or in proximity to the casing;
a plate mechanically connected to the casing by at least one attachment member and from which the at least one control rod projects; and
a locking/unlocking device positioned in a recess provided in the plate and having a stable position, wherein the control mechanism is configured so that, when the at least one control cable is mechanically connected to the at least one control rod, the locking/unlocking device is elastically moved away from its stable position to allow the partial introduction of the at least one control cable in the plate as far as a position in which the at least one control cable is mechanically and securely connected to the at least one control rod.

2. The control mechanism according to claim 1, wherein the plate comprises a roughly U shape, having a first arm, a second arm located facing the first arm and a bottom wall joining the first arm and the second arm, which delimit the recess, and wherein the first arm is mounted in abutment against the casing while the second arm is opposite the casing, on the same side as the at least one control cable.

3. The control mechanism according to claim 2, wherein the recess has a main opening that extends longitudinally along the first arm and the second arm, and two lateral openings extending between the bottom wall and opposite ends of the main opening.

4. The control mechanism according to claim 2, wherein the plate is provided with at least one through orifice provided in each of the first arm and second arm, with the at least one control rod projecting from the casing and passing through the space in the plate and each through orifice.

5. The control mechanism according to claim 2, wherein the plate is provided with at least one other through orifice provided in the second arm for passage of a tool for acting on the locking/unlocking device in the space in the plate with a view to moving it away from its stable position.

6. The control mechanism according to claim 1, wherein the locking/unlocking device is formed by an elastic member, having an attachment portion and at least one locking portion that extends from the attachment portion, and the locking/unlocking device can be positioned in the recess in the plate so that the at least one control rod to which the at least one control cable is mechanically connected is located against the locking portion on a second side of the elastic member.

7. The control mechanism according to claim 6, wherein the locking/unlocking device is positioned in the recess in the plate so that the locking portion is at least partially located facing the other through orifice provided in the plate.

8. The control mechanism according to claim 6, wherein the locking/unlocking device has at least one top portion that extends from the at least one locking portion and is bent so as to be facing a first side of the locking/unlocking device, opposite to the second side, with the top portion being positioned substantially flush with a longitudinal main opening in the plate.

9. The control mechanism according to claim 6, wherein the locking/unlocking device has at least one folded-over portion (347, 447) that extends from the at least one locking portion and is bent so as to be directed on the second side of the locking/unlocking device, with the at least one folded-over portion being provided with free edges, including a straight edge and at least one curved edge, with the curved edge allowing passage of the at least one control cable, and the straight edge being configured to be inserted in a groove formed on the at least one control cable so as to lock the positioning of the latter.

10. The control mechanism according to claim 6, wherein the locking/unlocking device is provided with two substantially straight locking portions that extend on either side of the attachment portion, and two safety lugs that each project from the attachment portion on a first side of the locking/unlocking device and in the direction of an opposite locking portion, with the safety lugs extending opposite each other so that they come into abutment against each other when the locking/unlocking device is elastically stressed while separating the locking portions.

11. The control mechanism according to claim 6, wherein the locking/unlocking device is provided with two substantially straight locking portions that extend on either side of the attachment portion, and two abutment pieces that are mechanically connected on a first side of the locking/unlocking device and cover the locking portions completely and the attachment portion partially, with the abutment pieces being configured so that they come into abutment against each other when the locking/unlocking device is elastically stressed while separating the locking portions.

12. The control mechanism according to claim 11, wherein the abutment pieces are sufficiently thick so that, when the locking/unlocking device is positioned in the recess in the plate, they are positioned substantially flush with a longitudinal main opening in the plate.

13. The control mechanism according to claim 1, wherein the at least one control rod is provided at a free end with a first attachment member and the at least one control cable is provided with a core surrounded by a sheath and having, at a free end of the core, a second attachment member configured to be mechanically connected to the first attachment member, and wherein the at least one control cable is further comprising an attachment zone formed at one end of the sheath, said attachment zone having at least a first thinned portion, a second thinned portion extending from the first end portion, and a third thinned portion extending from the second thinned portion and having a free edge, with the second thinned portion having a cross-section less than those of the first thinned portion and of the third thinned portion so that it forms a groove at the end of the sheath, and the attachment zone, together with the sheath, is able to move in translation with respect to the core and to the second attachment member.

14. The control mechanism according to claim 13, wherein when the second attachment member of the at least one control cable is mechanically connected to the first attachment member of the at least one control rod, the attachment zone of the at least one control cable is slid so as to pass through an orifice provided in the plate until it comes into contact with a locking portion of the locking/unlocking device, the third thinned portion elastically stresses the locking portion with its free edge so as to move it away and leave free the passage at least of the third thinned portion and of the second thinned portion in the space in the plate, and wherein the attachment zone slides until the third thinned portion is sufficiently sunk in the plate for the locking portion to return to the stable position in the groove formed by the second thinned portion in the sheath of the at least one control cable.

15. The control mechanism according to claim 14, wherein the attachment zone slides until it positions the first thinned portion at least partially in the space in the plate and thus having the rest of the sheath, the cross section of which is larger than the first thinned portion, coming into abutment substantially against the plate.

16. A system comprising:
a rail vehicle further comprising at least one control mechanism, wherein the at least one control mechanism further comprises:
a casing from which at least one control rod projects, and wherein the casing is configured to mechanically and securely connected to at least one control cable actuatable at a distance from or in proximity to the casing;
a plate mechanically connected to the casing by at least one attachment member and from which the at least one control rod projects; and
a locking/unlocking device positioned in a recess provided in the plate and having a stable position, wherein the control mechanism is configured so that, when the at least one control cable is mechanically connected to the at least one control rod, the locking/unlocking device is elastically moved away from its stable position to allow the partial introduction of the at least one control cable in the plate as far as a position in which the at least one control cable is mechanically and securely connected to the at least one control rod.

17. The system according to claim 16, wherein the rail vehicle is configured to act on mechanical members of the rail vehicle and the control mechanism of which is configured to unlock a rail system by actuation of the at least one control cable.

* * * * *